(12) United States Patent
Beard et al.

(10) Patent No.: US 7,302,570 B2
(45) Date of Patent: Nov. 27, 2007

(54) APPARATUS, SYSTEM, AND METHOD FOR AUTHORIZED REMOTE ACCESS TO A TARGET SYSTEM

(75) Inventors: Jonathan Douglas Beard, Tucson, AZ (US); Craig Frederick Schultz, Tucson, AZ (US); Douglas Wallace Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 10/644,140

(22) Filed: Aug. 19, 2003

(65) Prior Publication Data
US 2005/0044378 A1 Feb. 24, 2005

(51) Int. Cl.
*H04L 9/00* (2006.01)

(52) U.S. Cl. .......................... 713/171; 726/7; 713/182; 713/155

(58) Field of Classification Search ................ 713/171; 726/7
See application file for complete search history.

(56) References Cited

U.S. PATENT DOCUMENTS

| | | | |
|---|---|---|---|
| 4,974,156 A | 11/1990 | Harding et al. ............. | 364/200 |
| 5,239,294 A | 8/1993 | Flanders et al. ........ | 340/825.34 |
| 5,280,581 A | 1/1994 | Bathrick et al. ............ | 395/200 |
| 5,590,199 A * | 12/1996 | Krajewski et al. .......... | 713/159 |
| 5,627,967 A * | 5/1997 | Dauerer et al. ................. | 726/2 |
| 5,737,421 A | 4/1998 | Audebert ...................... | 380/23 |
| 5,802,176 A | 9/1998 | Audebert ...................... | 380/23 |
| 5,870,465 A | 2/1999 | Hosbach et al. ............ | 379/419 |
| 5,887,065 A | 3/1999 | Audebert ...................... | 380/23 |
| 5,903,571 A | 5/1999 | Koepper et al. ............ | 370/524 |
| 5,903,642 A | 5/1999 | Schwartz et al. ........... | 379/309 |
| 5,937,068 A | 8/1999 | Audebert ...................... | 380/23 |
| 6,131,164 A | 10/2000 | Parker ......................... | 713/201 |
| 6,360,258 B1 | 3/2002 | LeBlanc ...................... | 709/223 |
| 6,564,121 B1 | 5/2003 | Wallace et al. ............. | 700/231 |
| 7,089,265 B1 * | 8/2006 | Jain et al. ................. | 707/104.1 |

OTHER PUBLICATIONS

J.W. Peake, Automated Library Control Attachment, IBM Technical Disclosure Bulletin, vol. 35 No. 4B, Sep. 1992, pp. 386-388.

* cited by examiner

*Primary Examiner*—Gilberto Barrón, Jr.
*Assistant Examiner*—Jung Kim
(74) *Attorney, Agent, or Firm*—Kunzler & McKenzie

(57) ABSTRACT

An apparatus, system, and method are provided for authorized remote access to a target system. The apparatus, system, and method include a security module and an authorization module that cooperate to authenticate a remote user using three passwords. The apparatus, system, and method selectively generate an encrypted key in response to a first password. The authorization module decrypts the encrypted key and determines a third password in response to authenticating a second password and identifying a remote user within an authorized user list. The third password is then used to gain secure, traceable, and in certain embodiments, restricted remote access to a target system.

40 Claims, 8 Drawing Sheets

APPARATUS, SYSTEM, AND METHOD FOR AUTHORIZED REMOTE ACCESS TO A TARGET SYSTEM

BACKGROUND OF THE INVENTION

1. Field of the Invention

The invention relates to remote access to computer systems. Specifically, the invention relates to apparatus, systems, and methods for authorized remote access to a target system.

2. Description of the Related Art

Remote access to computer systems has generally been a desired feature of computer systems since computers began communicating with each other over communication networks. Remote access often saves a remote user time, travel, and other expenses involved in physically visiting a computer system. Remote access allows the remote user to interact with a computer system as though the user were using interface devices such as monitors, keyboards, and mice that directly connected to the computer system.

Remote access over communication networks may include a dialup connection over a telephone network, a terminal interface, or a network connection over a Local Area Network (LAN), a Wide Area Network (WAN), the Internet, or the like. Generally, the more geographic area the communication network covers, the more open the communication network is to remote connections from unauthorized remote users. Consequently, the more open the communication network is, the more the security of information passing over the network is a concern.

Generally, security systems for remote access involve a user ID and a password. Certain security systems may include multiple user ID and password interfaces before the remote user may remotely access a target system. However, the number of user ID password interfaces is balanced against the usability of the target system by remote access and the importance of the data or target system being protected. Having too many user ID/password interfaces may cause remote users to shun remote access due to the inconvenience.

One example of target systems that provide remote access is data storage and management systems. Businesses and large institutions such as governments rely heavily on computer systems that involve large amounts of sensitive data. The sensitivity of the data may relate to the privacy of individuals and/or trade secret information. Generally, one or more data storage systems comprising multiple storage subsystems manage the data. One example of such a storage system is a Virtual Tape System (VTS) available from International Business Machines™ of Armonk, N.Y. Typically, the VTS cooperates with an automated tape library (ATL) to provide large capacity primary or secondary storage.

Typically, remote access is provided to these data storage and management systems such that a manufacturer of the data storage system may readily monitor, service, or maintain the data storage system. Conventionally, due to the sensitivity of the data, owners of the data storage system are hesitant to allow anyone, including data storage system manufacturers, remote access to the data storage system. Some may require that all maintenance, service, and performance monitoring be performed on-site. Others may require that remote access only be provided in response to authorization granted by on-site system operator. Certain owners may require that the manufacturer only conduct remote access over a secure intranet. The owners seek to limit the exposure of the data storage system to threats of remote access by unauthorized remote users. In addition, it may be desirable that the actions of remote users be limited once a remote connection is made and traceable to determine where security vulnerabilities may lie.

Unfortunately, perfectly secure remote access is difficult to achieve. As mentioned above, conventional systems may require a remote user to provide a login ID and a password. However, the user ID and password may be generic and known to a number of technicians employed by the manufacturer to service a particular target system. The more people who know the user ID and password, the higher the risk that unauthorized users may learn the user ID and password.

Certain unscrupulous remote users may intentionally or accidentally disclose the user ID and password to an unauthorized third party. Confirming that the remote user providing the user ID and password is in fact an authorized remote user may be difficult. In addition, previously authorized users who know the user ID and password may become unauthorized due to misconduct, change in assignment, leaving the employ of the manufacturer, or the like. Conventional data storage systems do not provide an easy mechanism for revoking authorization from previously authorized remote users.

In addition, providing a single user ID and password may provide unrestricted access to the entire target system including subsystems. Typically, the actions of the connected remote user are not tracked. In addition, unsuccessful attempts to connect to the target system are also not tracked.

Accordingly, what is needed is an apparatus, system, and method to overcome the security risks of conventional security systems. In particular, the apparatus, system, and method should require a remote user to provide a plurality of passwords and/or user IDs. The apparatus, system, and method should provide restricted remote access to functionality of the target system. The apparatus, system, and method should track actions of remote users for both successful remote connections and unsuccessful remote connection attempts. The apparatus, system, and method should securely provide a random password to a remote user wherein authorization for the random password expires. In addition, the apparatus, system, and method should confirm that the remote user entering user identifiers and passwords is in fact still an authorized individual at the time remote access is attempted. Such an apparatus, system, and method are provided herein.

BRIEF SUMMARY OF THE INVENTION

The present invention has been developed in response to the present state of the art, and in particular, in response to the problems and needs in the art that have not yet been fully solved by currently available remote access security apparatus, systems, and methods. Accordingly, the present invention has been developed to provide a process, apparatus, and system for authorized remote access to a target system that overcome many or all of the above-discussed shortcomings in the art.

An apparatus according to the present invention includes a security module and an authorization module. The security module monitors remote access attempts to a target system by a remote user of a remote system. In response to a first password, the security module selectively generates and sends an encrypted key to the remote user. The encrypted key together with a second password, described in more detail below, may be used to obtain a third password. If the remote user provides the third password, the security module establishes a remote communication connection between the remote system and the target system.

A remote user obtains the third password from the authorization module. Preferably, the authorization module is remote from the target system. The remote user provides a second password to the authorization module. Preferably, the authorization module authenticates the second password and identifies the remote user within an authorized user list. Once the authorization module authenticates and identifies the remote user, the authorization module decrypts the encrypted key provided by the remote user. From the decrypted version of the encrypted key, the authorization module determines and provides a third password to the remote user.

In one configuration, remote users are added to the authorized user list if the remote user successfully completes a remote access application process. Remote users may be added using an update module. The update module may be operated manually or automatically. In addition, the update module may remove remote users from the authorized user list periodically if the remote user is missing from a master list. Preferably, the master list is used to authenticate the second password. Consequently, if a remote user is removed from the master list, the second password will not be authenticated and a check to identify the remote user within the authorized user list will not be initiated, so the encrypted key will not be decrypted.

In certain configurations, the apparatus of the present invention includes a log module configured to log actions of the remote user communicating with the target system and the authorization module. The log module may record successful actions as well as unsuccessful actions. In addition to the actions, the log module may record date and time information related to the action.

A system of the present invention is also presented for authorized remote access to a target system. In particular, the system, in one embodiment, includes a target system and an authorization server. The target system selectively generates an encrypted key in response to a first password and establishes a remote communication connection with a remote system in response to a third password. The authorization server provides the third password. Preferably, the authorization server is physically remote from the target system. The authorization server decrypts the encrypted key and determines the third password in response to authenticating a second password and identifying a remote user within an authorized user list. The authorization server sends the third password to the remote system.

A method of the present invention is also presented for authorized remote access to a target system. In one embodiment, the method includes retrieving an encrypted key from a target system accessed by way of a first password. The first password may be disclosed to a plurality of remote users who have successfully completed a remote access application process. In addition, the first password may be associated with a specific set of commands available to the remote user on the target system. Next, the remote system connects to an authorization module using a second password to retrieve a third password associated with the encrypted key, the authorization module selectively decrypts the encrypted key, in response to determining that a remote user is identified within an authorized user list. Finally, the remote user logs into the target system using the third password.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
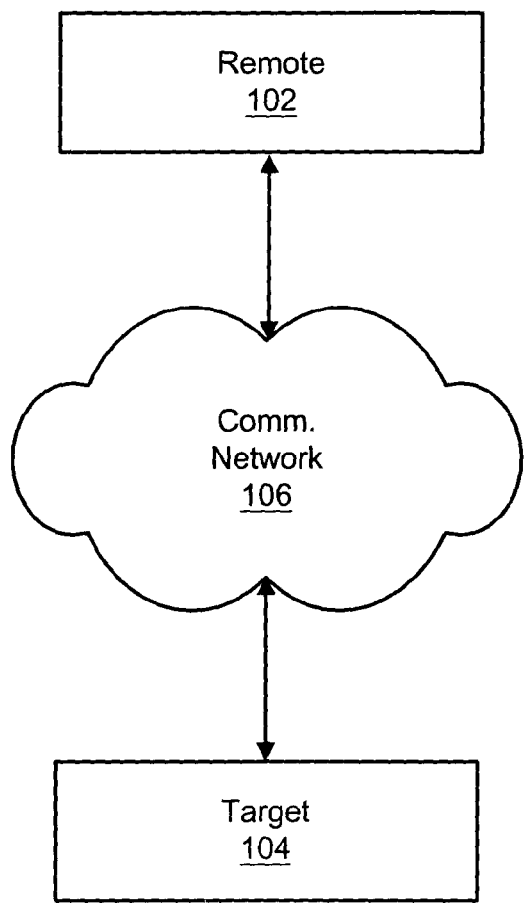
FIG. 1 is a schematic block diagram illustrating one embodiment of a representative system suitable for implementing the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a schematic block diagram of one embodiment of a representative system 100 suitable for implementing the present invention. The system 100 includes a remote system 102 coupled to a target system 104 by way of a communication network 106. The present invention allows a remote-user-regulated, tracked, short-term remote access to the target system 104.

The remote system 102 allows a remote user to use conventional I/O (Input/Output) devices (not shown) such as a monitor, keyboard, and mouse, connected to the remote system 102 to interact with the target system 104 as though the remote user operated corresponding I/O devices directly connected to the target system 104. Once a remote communication connection is established, I/O information is exchanged between the remote system 102 and the target system 104. Preferably, the remote system 102 and target system 104 exchange I/O information at a sufficient rate to minimize latency between user input and a response.

Providing basic I/O functionality typically does not require significant hardware or software resources. Consequently, a variety of computer systems including a wide variety of I/O devices may serve as a remote system 102. For example, the remote system 102 may comprise a mainframe computer, a server, a personal computer, a dumb terminal, a hand held computer, or the like.

The target system 104 comprises any computer system for which remote access is desirable. The target system 104 may comprise a large mainframe system, a data storage management system, a personal computer, or any subsystem configured to allow remote access for interfacing with the target system 104. As mentioned above, in certain embodiments, the target system 104 comprises a VTS system. Alternatively, the target system 104 may comprise a controller for one or more subsystems such as a Virtual Tape Controller (VTC), Total Storage Master Console (TSMC), or the like. The target system 104 may comprise an actual hardware component or a virtual component of a computer system. Preferably, the target system 104 is uniquely identifiable, for example, by an IP address on an Internet Protocol (IP) network 106.

The remote system 102 and target system 104 communicate using well known protocols over the communication network 106. Preferably, these protocols encrypt individual messages passed over the network 106. In addition to the communication protocols, the remote system 102 and target system 104 may execute one or more software module and/or protocols to provide remote access. Representative examples of these include Telnet, Rlogin, terminal services, and the like.

The communication network 106 may comprise a public or private network of any size or configuration that supports remote access software modules and/or protocols. In addition, the communication network 106 may comprise a wired or wireless storage area network (SAN), local area network (LAN), wide area network (WAN), or a different type of network, such as the Internet.

As mentioned above, the present invention provides remote access in a manner that properly balances the need for remote access to authorized users for a reasonable duration against the security needs of the target system. The present invention also restricts the permissible actions of a remote user once the user is connected and tracks actions executed by the remote user.

Figure 2:
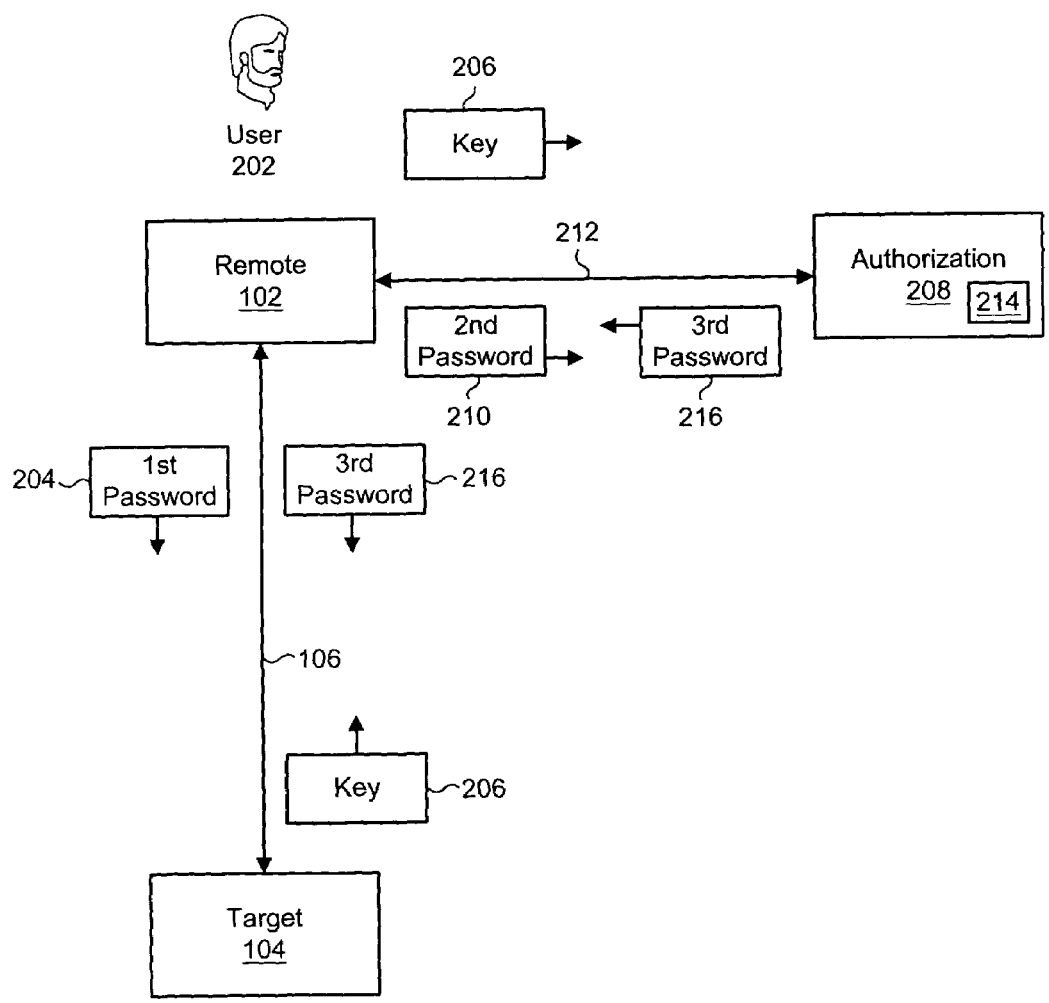
FIG. 2 is a logical block diagram illustrating one embodiment of an apparatus in accordance with the present invention.

FIG. 2 illustrates a logical block diagram of one embodiment of the present invention. A remote user 202 desiring remote access to the target system 104 operates the remote system 102. The remote system 102 initiates communication with the target system 104. The remote system 102 is unable to perform any function on the target system 104 other than requesting remote access.

In response to the communication from the remote system 102, the target system 104 requests a first password 204. Preferably, the target system 104 also requests a user ID (not shown). Typically, a system uses user IDs for tracking and identifying a remote user 202. Consequently, user IDs may not be held as confidential as passwords. User IDs may also be readily guessed based on the context for remote access. For example, general remote access may require a user ID that is typically the user's name, initials, or some combination thereof. Those of skill in the art will recognize that with each password discussed in relation to the present invention there is preferably an associated user ID. However, to focus on the invention and because user IDs are typically used for tracking and administrative purposes related to remote access, they are not discussed here in great detail.

The remote system 102 sends the first password 204 across the network 106. The target system 104 confirms that the first password 204 is correct and sends an encrypted key 206 in response. Preferably, the encrypted key is an unintelligible series of ASCII characters.

Next, the remote system 102 initiates communication with an authorization module 208. Prior to establishing communications with the authorization module 208, the remote system 102 provides a second password 210 and associated user ID. Preferably, the authorization module 208 logs on the remote user 202 in response to the correct second password 210 and user ID. The remote system 102 also preferably sends the encrypted key 206 either together with the second password 210 or separately.

Preferably, the remote system 102 communicates with the authorization module 208 over a separate communication network 212. In certain embodiments, the communication network 212 is a secure internal intranet accessible by a predefined set of users. Alternatively, the communication network 212 may be a public network or even the same network as the communication network 106 between the remote system 102 and the target system 104. In certain embodiments, all communication data packets exchanged over the communication network 212 or communication network 106 are encrypted for additional security.

In one embodiment, in conjunction with logging a remote user 202 on, the authorization module 208 attempts to identify a remote user 202 within an authorized user list 214. If the authorization module 208 does not locate the remote user 202 within the authorized user list 214, the remote user 202 is not logged on to the authorization module 208. If the remote user 202 is identified within the authorized user list 214, the authorization module 208 decrypts the encrypted key 206.

The authorization module 208 derives a unique third password 216 from the decrypted version of the encrypted key 206. The authorization module 208 sends the third password 216 to the remote system 102 and logs the remote user 202 off the authorization module 208.

Once again, the remote system 102 initiates communication with the target system 104. Next, the remote system 102 provides the third password 216 instead of the first password 204. In addition, the remote user 202 may provide a user ID unique to that user along with the third password 204. In this manner, the actions of a specific remote user 202 may be traced.

If the target system 104 determines that the third password 216 is correct, the remote user 202 is logged on, and a remote communication connection is established. Preferably, the third password 216 is effective only for a short duration of time. For example, the selected period of time may be twenty-four hours. Alternatively, the duration of the third password 216 may comprise a predetermined number of logins, such as five. In another alternative, the duration may depend on the number of logins within a specific time period.

Once a remote user 202 is logged on, the target system 104 may restrict the actions a remote user 202 may perform over the remote connection and may also log actions taken by the remote user 202. The restricted actions may be defined by the first password 204 or the third password 216.

FIG. 2 illustrates that the present invention provides a unique apparatus, system, and method for authorized remote access to a target system. First, the present invention establishes a remote communication connection, if the remote user 202 provides three separate passwords 204, 210, 216. The third password 216 is made available once an encrypted key is decrypted by an authorization module 208. Second, a remote user 202 must be identified within an authorized user list 214 to obtain the third password 216. And finally, remote access is available for a short duration and actions of a remote user 202 are logged in detail.

Figure 3:
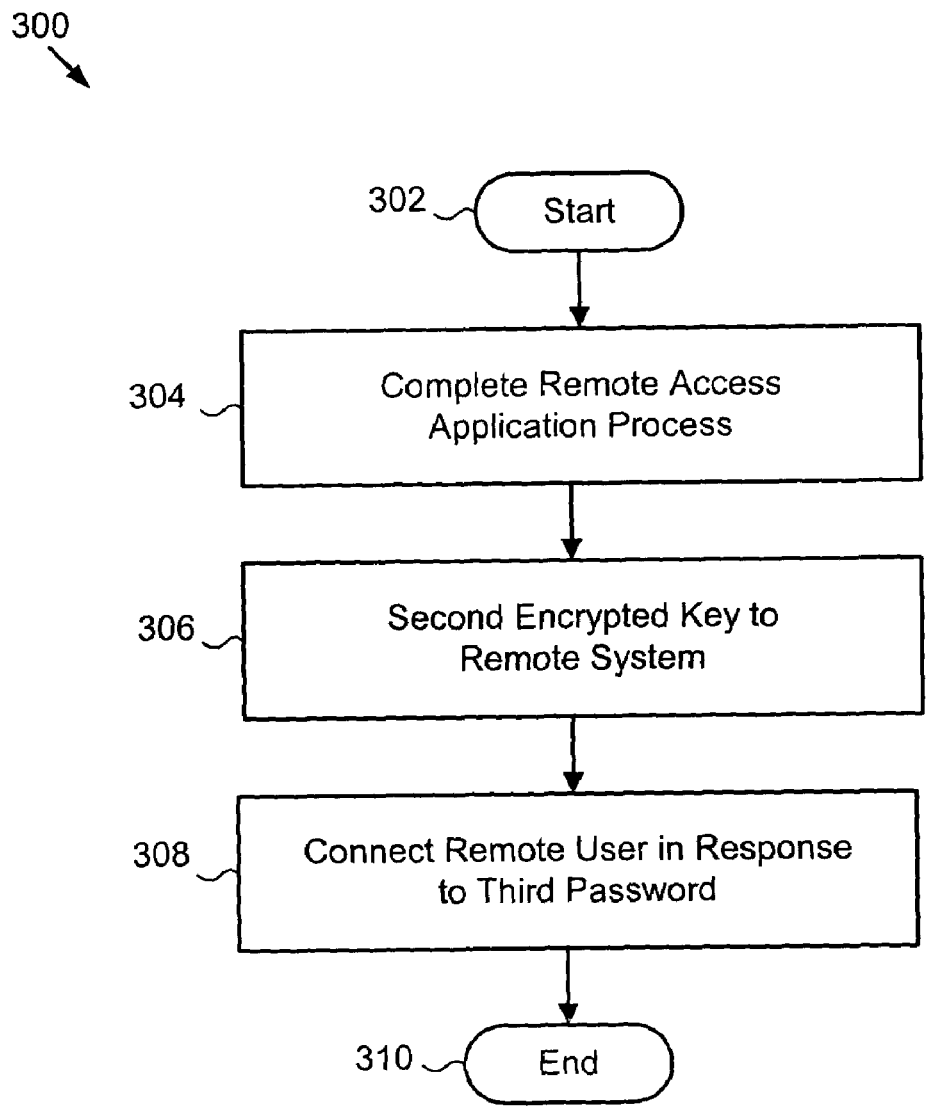
FIG. 3 is a schematic flow chart diagram illustrating a method for authorized remote access to a target system according to one embodiment of the present invention.

FIG. 3 illustrates a method 300 for authorized remote access to a target system from the perspective of the target system 104. The method starts 302 when a remote user 202 desires remote access to a target system 104. In certain embodiments, there may be no formal relationship between the owners of the target system 104 and the remote user 202. Understandably, the owners of the target system 104 may be reluctant to allow the remote user 202 access to the target system 104. This is particularly so, if the target system is a data storage system that includes highly sensitive data.

In certain circumstances, the manufacturer of the target system 104 may have an obligation with the owners of the target system 104 to maintain, repair, or monitor the performance of the target system 104. Due to the cost savings and convenience of remote access, the manufacturer may desire to fulfill this obligation to the owners of the target system 104 by remote access. The owners of the target system 104 may agree provided that the most strict security precautions are taken. The method 300 of the embodiment depicted in FIG. 3 includes one of these optional security precautions.

In certain embodiments, a remote user 202 may be required to complete 304 a remote access application process. Protecting confidential information and/or target systems 104 often involves requirements that only those who need to know or need to have access are provided that access. The remote access application process is one way to ensure that only those who need to have remote access are authorized to have that access.

A remote access application process may have various forms all within the scope of the present invention. In one embodiment, the remote user 202 must fill out an application for remote access. Preferably, the application is completed manually using paper or on-line forms. The application may require information from the remote user 202 such as his/her job title, employer, basic demographic information, and the like. The application may also require information about the remote user's credentials and skills such as education, skills, certifications, experience, project history, and the like. The form and format of the application is not critical to the present invention except, but it is preferred that sufficient information is provided that one reviewing the application would be able to fairly determine the competency and trustworthiness of the remote user 202.

In addition, the application may permit a remote user 202 to identify the level of remote access desired for the target system 104. Preferably, the present invention allows restricted levels of remote access, up to a level of full access, to perform actions remotely that may be performed locally on the target system 104.

The completed application is then provided to one or more supervisors of the remote user 202. In the context described above, the remote user 202 may be an employee of the manufacturer obligated to service the target system 104 using remote access. In this context, the immediate supervisor and, in certain embodiments, a regional supervisor may review the remote access application. Supervisors may be designated solely by the manufacturing company or with input from the owners of the target system 104.

The supervisors and possibly owners of the target system 104 approve or deny the remote access application. If the application is approved, the remote user 202 is provided with the first password 204. In addition, the information identifying the remote user 202 is entered into the authorized user list 214. If the application is denied, the remote user 202 may be notified.

Once a remote user 202 attempts to log onto the target system 104, the method 300 continues by sending 306 the encrypted key 206 to the remote system 102. As described above, the remote user 202 then connects to an authorization module 208. The authorization module 208 decrypts the encrypted key 206 to retrieve a third password 216 if the remote user 202 is on the authorized user list 214 and provides a correct second password 210. Next, the remote user 102 is allowed to connect 308 to the target system 104 in response to providing the third password 216, and the method 300 ends 310.

Figure 4:
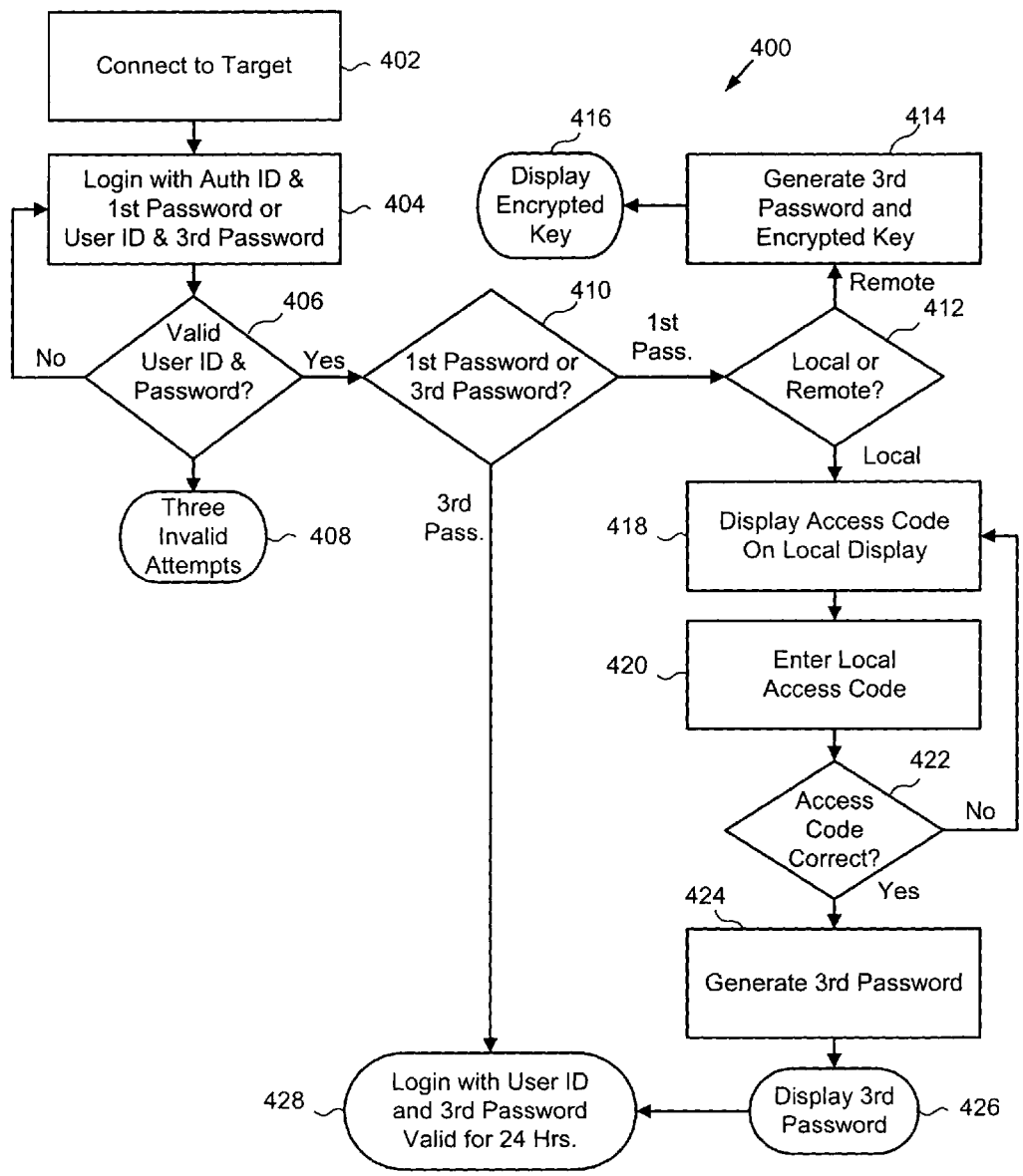
FIG. 4 is a schematic flow chart diagram illustrating in more detail a method for authorized remote access to a target system according to one embodiment of the present invention.

FIG. 4 illustrates one embodiment of a method 400 for authorized remote access to a target system from the target system's perspective. First, a remote system 102 connects 402 to the target system 104. Connecting the remote system 102 and the target system 104 may involve various well known hardware components and communications protocols that are not critical to the present invention. For example in one embodiment, the remote system 102 communicates over a Plain Old Telephone (POTS) network with a modem (not shown) connected to the target system 104.

The modem may optionally require a password before the communication connection is established. In certain embodiments, a plurality of target system 104 may share a single serial switch (not shown) for implementing remote access. Preferably, the serial switch also requires a password which changes periodically, such as monthly. Those of skill in the art will recognize that the functions of the modem and serial port may also be performed by a gateway, router, firewall, or server on other communication networks 106.

Next, a remote user 202 logs into 404 the target system 104. Typically, logging in involves entering a user ID and a corresponding password in response to a prompt. Accordingly, references herein to logging in with a user ID or a password implicitly includes entering and authenticating both, even if both are not always described together. Typically, a target system 104 permits various passwords and has a well defined set of permitted user IDs. With well defined user IDs, the target system 104 may conditionally take certain actions based on the user IDs.

In certain embodiments, the remote user 202 enters one of two user IDs and the corresponding passwords depending on the current phase of the remote access connection. The first phase is when the remote user 202 has not yet received a third password 216. The second phase begins with logging in to the target system 104 with a user ID and known third password 216. The user ID may be unique to the remote user 202 to facilitate tracking actions once a remote access connection is established.

In one embodiment, during the first phase, the remote user 202 enters an authentication ID and a first password 204. The first password only allows the remote user 202 to obtain an encrypted key 206 needed to obtain a third password 216. The third password 216 provides access at a certain access level to the remote user 202. The access level may be defined by the first password 204, the authentication ID, or both.

Next, a determination 406 is made as to whether the identifier (authentication ID or user ID) and password (first or third) are valid. If three invalid user ID and password combinations are provided 408, the communication connection with the remote system 102 is terminated by the target system 104.

If the authentication ID and first password 204 are valid, the method 400 continues by determining 410 whether a first password 204 or a third password 216 was provided. If a first password 204 is provided, in certain embodiments, a determination 412 may then be made whether the remote user 202 is local (physically at the same site as the target system 104) or remote, off-site. The remote user 202 may be prompted for information about the remote user's location.

If the remote user 202 is remote, a third password 216 and encrypted key 206 are generated 414. Next, the encrypted key 206 is displayed 416 to the remote user 202. As described in more detail below, the encrypted key 206 is then decrypted using an authorization module 208.

In certain embodiments, the remote user 202 may be required (not shown) to provide his/her user ID. With the user ID, the target system 104 may create a temporary user account associated with the user ID and third password 216. Preferably, the third password 216 is random and temporary. In addition, the third password 216 and/or encrypted key 206 may incorporate the user ID for authentication later by the authorization module 208.

Preferably, the encrypted key 206 incorporates the user ID and third password 216. The encrypted key 206 may be of any length and is preferably in ASCII characters. The encrypted key 206 may be generated using a variety of encryption algorithms including block and stream ciphers such as Data Encryption Standard (DES), Vernam, and the like.

If it is determined 412, that the remote user 202 is actually local (physically at the same site as the target system 104), an access code is displayed 418 on a local display of a system display visible only to operators on-site. An on-site user must enter 420 the access code correctly. Next, a determination 422 is made whether the access code is correct. Once the access code is correctly entered, the third password 216 is generated 424 and displayed 426 to the local user. The local user is permitted to log-in 428. If the access code is not correctly entered, the access code may once again be displayed to the local users.

If the remote user 202 has the correct third password 216 and the determination 410 is made that the correct user ID and third password 216 were entered, the method 400 continues to allow the remote user 202 to login 428. Finally, a local or remote user 202 logs into the target system 104 using his/her user ID and the third password 216.

Figure 5:
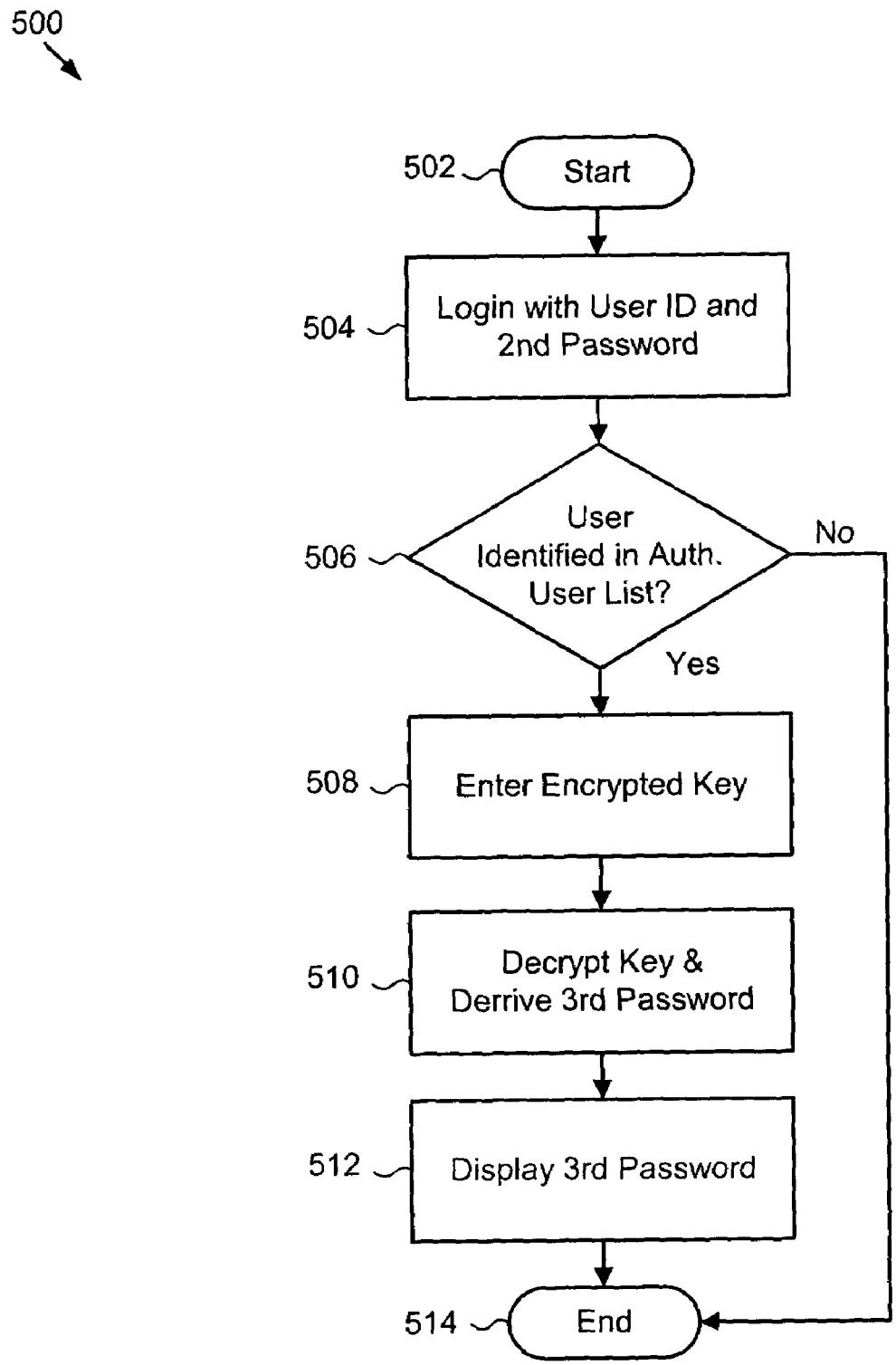
FIG. 5 is a schematic flow chart diagram illustrating a method for communicating with an authorization module to obtain a third password according to one embodiment of the present invention.

FIG. 5 illustrates a method 500 for authorized remote access to a target system from the perspective of an authorization module 208. Method 500 permits an authorized remote user 202 to obtain the third password 216 needed to login during the second phase discussed above in relation to FIG. 4. The method 500 starts 502 when a remote user 202 operating the remote system 102 connects to the authorization module 208.

The remote user 202 logs in 504 using his/her user ID and a second password 210. Preferably, the remote user 202 maintains authority to define and change the second password 210. Preferably, only the remote user 202 knows the second password 210.

Next, a determination 506 is made whether the remote user 202 is identifiable within an authorized user list 214. Typically, the authorization module 208 scans a list of authorized users searching for a match for the remote user's user ID, password, or a combination of these. The authorized user list 214 may be stored in a variety of formats including primary memory data structures such as arrays and linked lists, and secondary data structures such as files, databases, and the like.

In one embodiment, users that properly complete a remote access application process are added to the authorized user list 214. The authorized user list 214 may be modified periodically to eliminate previously authorized remote users who no longer have a need for remote access. Such circumstances may comprise changing job responsibilities, firing or laying off an employee, or the like. Records identifying a remote user 202 may be removed automatically when the remote user's personal account is terminated.

For example, in one embodiment, the authorization module 208 may confirm a remote user's user ID using the authorized user list 214 and a remote user's password using a corporate security system on an intranet. Accordingly, if the remote user's account has been terminated, the users password will not be confirmed, even if the remote user's user ID is still in the authorized user list 214. In this manner, the maintenance schedule for the authorized user list 214 does not pose a security risk for the target systems 104.

If the remote user 202 is identified in the authorized user list 214, the remote user 202 is prompted to enter the encrypted key 206. The remote user 202 then enters 508 the encrypted key 206. The authorization module 208 decrypts 510 the encrypted key 206 and derives from it the third password 216. To decrypt the encrypted key 206, the authorization module 208 preferably uses the same key and encryption cipher used by the target system 104 that generated the encrypted key 206.

Deriving the third password 216 may be simple or complex. In one embodiment, the third password 216 is concatenated to a string of other information in the decrypted version of the encrypted key 206. Consequently, the authorization module 208 simply parses the decrypted string to derive the third password 216. Alternatively, the target system 104 may compute or encode a third password 216 using an algorithm. The authorization module 208 may use the same algorithm to compute or decode the third password 216.

Next, the third password 216 is displayed 512 to the remote user 202 and the method 500 ends 514. The remote user 202 now has sufficient information to gain access to the target system 104. Once the third password 216 is communicated, communication between the remote system 102 and the authorization module 208 is terminated.

Referring back to FIG. 4, a remote user 202 logs in 404 using his/her user ID and third password 216. The remote user 202 enters the information in response to a prompt. Method 400 is followed until the remote user 202 is actually logged in 428 using the user ID and the third password 216.

Figure 6:
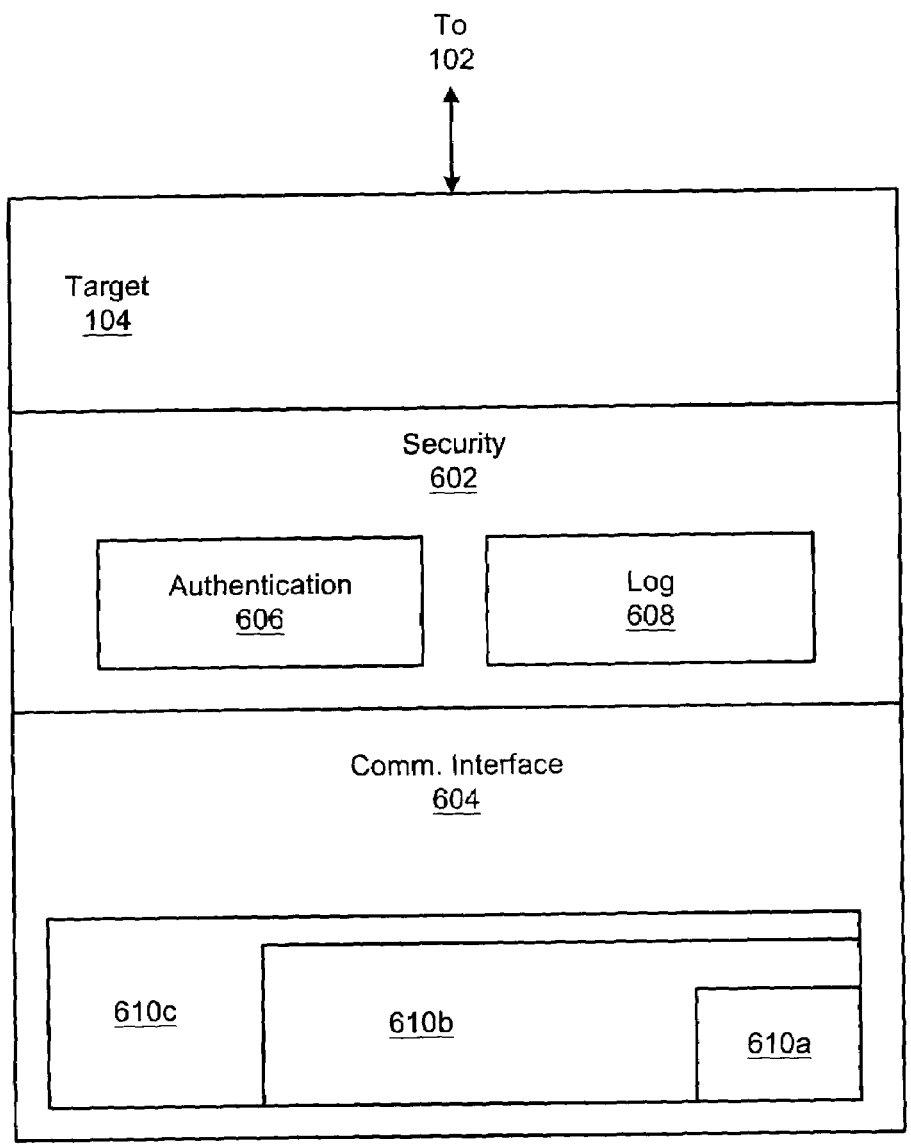
FIG. 6 is a schematic block diagram illustrating part of an apparatus for authorized remote access to a target system according to one embodiment of the present invention.
Figure 7:
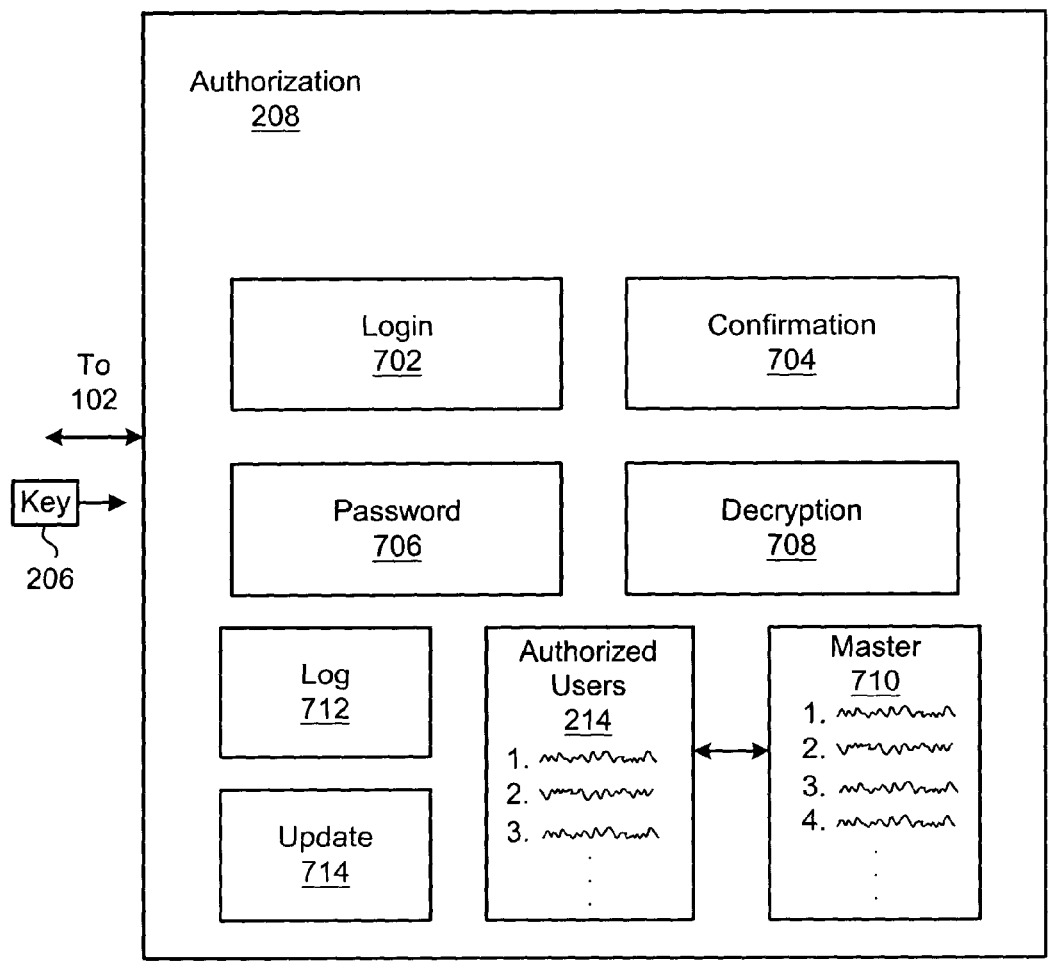
FIG. 7 is a schematic block diagram illustrating part of an apparatus for authorized remote access to a target system according to one embodiment of the present invention.

FIG. 2 illustrates the logical relationship of modules in apparatus of the present invention. FIGS. 6 and 7 illustrate greater detail of certain embodiments of apparatus for authorized remote access to a target system. FIG. 6 illustrates a representative embodiment of a target system 104 configured to implement the present invention.

In one embodiment, the target system 104 includes a security module 602 and a communication interface 604. The security module 602 cooperates with the communication interface 604 to provide secure remote access. Preferably, requests to communicate with the target system 104 are directed to the security module 602. Once the remote communication connection is established, the security module 602 passes communication information to the communication interface 604.

Preferably, the security module 602 is self-contained and configured such that the security module 602 may be readily coupled to an existing communication interface 604 in any target system 104. For example, the security module 602 may include a separate set of prompts from the communication interface 604 as well as functions that implement the method 400 described above. The security module 602 may comprise a single function, software object, set of embedded microcode, separate hardware component, or the like that implements the features described in relation to method 400.

In one embodiment, the security module 602 includes an authentication module 606 and a log module 608. The authentication module 606 authenticates that a remote user 202 has entered a valid user ID and third password 216 or authentication ID and first password 204. In addition, the authentication module 606 generates the third password 216 and encrypted key 206. Preferably, the third password 216 is a random password 216 valid for a relatively short time period. Furthermore, the authentication module 606 manages interactions with a user attempting to gain local access. The authentication module 606 includes well known functions, algorithms, prompts, and interface components to accomplish these functions.

In certain embodiments, the authentication module 606 is configured to determine the valid life span of the third password 216. For example, the third password may be valid for twenty-four hours. Consequently, the authentication module 606 may include functionality for detecting when a third password 216 has expired. Similarly, the third password 216 may be limited to a certain number of remote access connections, such as three. The authentication module 606 includes a function to reject further requests for a remote access connection after the third request.

The authentication module 606 communicates with the log module 608 to gather relevant information for identifying authorized and unauthorized attempts to gain access either from a remote system 102 or a user on-site. Of course, the granularity of the log recorded may vary considerably as discussed in more detail below. In a preferred embodiment, sufficient communication information is recorded that potential weaknesses in the security module 602 may be traced and resolved.

Preferably, the log module 608 records a timestamp, the user ID, passwords, and other responses provided by the remote user 202. The log module 608 may also record the commands and parameters issued by the remote user 202 once a remote communication connection is established. The log module 608 may also include a screen capture of the responses provided by the target system 104. In this manner, incorrect commands and/or responses by the target system 104 may be diagnosed and remedied.

In addition, the log module 608 may record the number of connections attempts (both successful and unsuccessful) made by a particular user ID and password combination. In this manner, the log module 608 allows for tracking of actions by both authorized and unauthorized users. Preferably, a log produced by the log module 608 is stored in a database.

Typically, the communication interface 604 comprises a conventional interface for providing remote access. The communication interface 604 passes Input/Output (I/O) information between the target system 104 and a remote system 102. The I/O information is typically divided into data packets that are communicated using well known communication protocols such as TCP/IP, NetBeui, and the like. The data packets may include commands that a target system 104 is to execute, as well as text, images, prompts, and other information provided by the target system 104 in response to commands from the remote user 202.

Preferably, the communication interface 604 permits a remote user 202 to perform the same actions or commands that may be performed using a user interface (not shown) of the target system 104 available to users on-site. In this manner, the remote user 202 need not physically visit the target system 104.

In certain embodiments, the commands available to a user (remote or local) are organized according to a plurality of access levels 610a, 610b, 610c. Preferably, the access levels 610a, 610b, 610c are hierarchical such that each access level 610a, 610b, 610c makes more commands available than the last. This hierarchical relationship is illustrated by the nested access level boxes. Consequently, access level 610a provides a minimal set of commands. In one embodiment, a user having access level 610a privileges may be permitted to execute basic diagnostic and reporting commands on the target system 104. A user having access level 610b privileges may be permitted to execute all of the commands in the access level 610a as well as executing predetermined error recovery and/or maintenance commands on the target system 104. A user having access level 610c privileges may be permitted to execute all of the commands in the access level 610b and access level 610a as well as executing any other command available to a user with full authority on the target system 104.

Preferably, the access levels 610a, 610b, 610c are determined by the first password 204 and/or its associated user ID. The first password 204 and associated user ID may be provided to a select set of users, for example those who are permitted access according to a remote access application process. Consequently, a different first password 204 and user ID combination may be associated with each access level 610a, 610b, 610c.

Based on the first password 204 and user ID combination provided, the authentication module 606 may define a temporary user account on the target system 104 for the remote user 202. The temporary user account may include the first password 204 and user ID combination as well as the third password 216. This temporary user account may then be referenced to authenticate a remote user 202 when the remote user 202 inputs his/her user ID and third password 216 obtained from the authorization module 208.

FIG. 7 illustrates one embodiment of an authorization module 208 suitable for implementing the present invention. The authorization module 208 includes a login module 702, a confirmation module 704, a decryption module 706, and a password module 708. These modules cooperate to provide a temporary password such as the third password 216 to a remote user 202 desiring remote access to a target system 104.

The login module 702 establishes a communication connection in response to a connection request. Additionally, the login module 702 prompts the remote user 202 for a personal password and a personal user ID. Preferably, the personal password corresponds to the second password 210 described above. The personal user ID together with the personal password 210 uniquely identifies the remote user 202.

In one embodiment, the login module 702 verifies a user's identity by looking up the personal password 210 and/or personal user ID in a master list 710 of users. If a remote user 202 is not identifiable within the master list 710, the connection with the remote system 102 is terminated.

The master list 710 includes all users that may potentially be authorized for remote access to the target system 104. For example, the master list 710 may include all employees of a manufacturer that routinely service or maintain the target system 104. Alternatively, the master list 710 may include all employees of an owner of the target system 104. Preferably, the master list records the personal password 210, personal user ID, and other identifying information about each remote user 202.

In one embodiment, to provide additional security, if the remote user 202 is identified within the master list 710, the login module 702 does not establish a communication connection until the confirmation module 704 verifies the remote user's identity within an authorized user list 214. Alternatively, the login module 702 may cooperate with the confirmation module 704 to identify a remote user 202 using the authorized user list 214 instead of the master list 710.

The confirmation module 704 identifies a remote user 202 within the authorized user list 214. The confirmation module 704 may search the list for a matching personal password 210, personal user ID. In certain embodiments, the authorized user list 214 is a subset of the master list 710 and includes all the same information, but fewer users. Alternatively, the authorized user list 214 may comprise only the information necessary to properly identify the remote user 202, such as personal password 210 and personal user ID. In yet another alternative, the authorized user list 214 and master list 710 may comprise the same list.

If the remote user 202 is properly identified within the authorized user list 214, the confirmation module 704 communicates to the decryption module 708 that a valid communication connection has been established. In one embodiment, the decryption module 708 then prompts the remote user 202 for the encrypted key 206. Alternatively, the login module 702 may prompt for the encrypted key 206. the decryption module 708 decrypts the encrypted key 206 using the same encryption algorithm(s) and key(s) used by the target system 104. The decryption module 708 provides a decrypted version of the encrypted key 206 to the password module 706.

The password module 706 derives a temporary password such as the third password 216 from the decrypted version of the encrypted key 206. In certain embodiments, prior to deriving the third password 216, the password module 706 confirms that the personal user ID (and/or second password 210) provided by the remote user 202 to the login module 702 matches a user ID incorporated into the encrypted key 206 by the target system 104. This confirms that the same remote user 202 connects to the target system 104 to generate the encrypted key 206 and to the authorization module 208 to decrypt the encrypted key 206.

Deriving the third password 216 may be simple or complex. In one embodiment, the third password 216 is simply a predefined suffix, prefix, or intermediate portion of the decrypted version of the encrypted key 206. Alternatively, the third password 216 may be derived or computed using a predefined algorithm that is also used by the target system 104 though of course, the algorithm is used in reverse for decryption.

The password module 706 communicates the third password 216 to the authorized remote user 202. The third password 216 may be sent by way of an I/O module (not shown). Preferably, the third password 216 is displayed on a display device of the remote user 202.

Preferably, successful and unsuccessful attempts to login to the authorization module 208 and/or decrypt the encrypted key 206 are logged at the authorization module 208 by a log module 712. A log generated by the log module 712 at the authorization module 208 may be compared with a log from the log module 608 of the target system 104 to provide more information regarding the actions of remote user in a failed or successful attempt to establish unauthorized remote access to a target system 104. The log module 712 may record a timestamp, the personal password 210 and personal user ID, and the encrypted key 206.

In addition, the authorization module 208 may include an update module 714. The update module 714 allows the authorized user list 214 to be updated either manually or automatically as needed.

For manual updates, a user authorized to modify the authorized user list 214 may connect to the authorization module 208 and add, delete, or change information for remote users 202 listed. The changes may be initiated by internal business processes conducted periodically to ensure that remote users 202 listed in the authorized user list 214 have a current need for the remote access. As circumstances regarding the remote users change, so do the remote users' need for remote access.

In certain embodiments, the update module 714 may periodically, either in response to an elapsed time period or a user command, initiate a comparison between the master list 710 and the authorized user list 214. Comparison criteria may cause the update module 714 to automatically remove information identifying remote users 202 from the authorized user list 214 if the same information is not found in the master list 710. In this manner, the update module 714 facilitates keeping the authorized user list 214 current such that disgruntled remote users removed from the master list 710, but not yet manually removed from the authorized user list 214, do not have a window of opportunity to gain unauthorized remote access to the target system 104.

Figure 8:
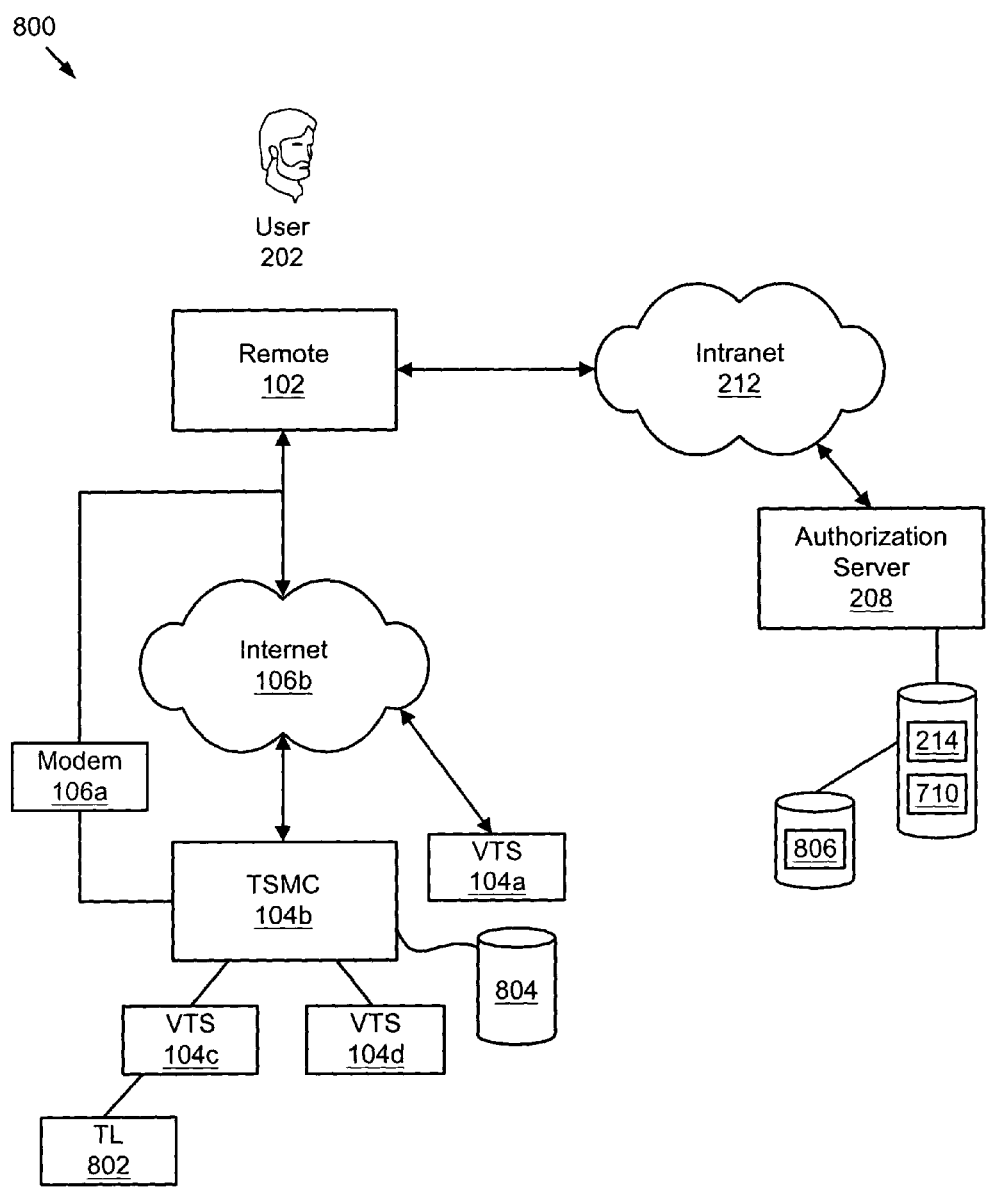
FIG. 8 is a schematic block diagram illustrating a system for authorized remote access to a target system according to one embodiment of the present invention.

FIG. 8 illustrates a representative example of a system 800 that may be used under the invention for authorized remote access to a target system. The system 800 includes a remote system 102, a target system 104, and an authorization server 208. As mentioned above, the remote system 102 may comprise any computer system capable of exchanging I/O with the target system 104 over the communication network 106. The remote system 102 may execute one of many remote access programs such as terminal services, telnet, or the like.

The remote system 102 may use one of a plurality of communication networks 104. For example, the remote system 102 may communicate with a modem 106a connected to a telephone network. Alternatively, the remote system 102 may communicate over a public communication network such as the Internet 106b. In yet another alternative, the remote system 102 may communicate over an intranet (not shown) with the target system 104. Preferably, communications between the remote system 102 and the target system 104 are kept secure by using encryption of individual data packets passing over the communication network 106.

As mentioned above, the target system 104 may comprise a variety of computer systems including both large systems as well as subcomponents such as controllers. In FIG. 8, a data storage system such as a Virtual Tape Server (VTS) serves as the target system 104. A remote user 202 may desire remote access in order to complete maintenance or trouble shooting procedures on the VTS 104a.

Of course, a plurality of VTS systems 104c, 104d may be coupled to a single control console such as a Total Storage Master Console 104b (TSMC). The TSMC 104b may serve as a central access point for monitoring and controlling the VTSs 104c, 104d. One or more of the VTSs 104c, 104d, may be coupled to a Tape Library 802 (TL) or other mass storage device. Commands for a specific VTS 104c, 104d may be directed through the TSMC 104b.

The VTS 104a or the TSMC 104b may include a security module 602 and communication interface 604 similar to those discussed in relation to FIG. 6. Alternatively, the TSMC 104b may include a security module 602 that restricts remote access to predefined access levels 610 and communications may pass through the communication interfaces 604 of the VTSs 104c, 104d.

In certain embodiments, establishing a remote communication connection with the TSMC 104b still requires a remote user 202 to log-in individually to a desired VTS 104c, 104d. In these embodiments, a security module 602 residing on the TSMC 104b may propagate the newly generated third password 216 to each connected VTS 104c, 104d. The third password 216 may be propagated, for example, by creating a temporary account for the remote user 202 on each connected VTS 104c, 104d.

Preferably, the TSMC 104b or a VTS 104a is coupled to a database for storage of a log 804. Alternatively, the log 804 may comprise a binary or text file. The log 804 may be backed up to more permanent storage as deemed necessary by the owner of the target system 104.

Once the remote user 202 has obtained the encrypted key 206, a connection is established over the communication network 212 with the authorization module 208. Preferably, the communication network 212 comprises a secure intranet controlled by a manufacturer of the target system 104.

In FIG. 8, the authorization module 208 is implemented on an authorization server 208. The authorization server 208 may comprise a separate piece of hardware dedicated to decrypting encrypted keys 206 for authorized remote users 202. Alternatively, the authorization server 208 may comprise a software module executing on a conventional server. Preferably, the authorization server 208 is physically separate and distinct from the remote system 102 and the target system 104.

In certain embodiments, the authorization server 208 communicates with a database that stores the authorized user list 214 and the master list 710. Alternatively, the master list 710 may be stored in a different database in communication with the authorization server 208. Furthermore, either in the same database or a different database, the authorization server 208 may store a log 806.

In summary, the present invention provides an apparatus, system, and method that require a remote user to provide a plurality of passwords and/or user IDs to different systems. The present invention provides restricted remote access to functionality of the target system and tracks actions of remote users for both successful remote connections and unsuccessful remote connection attempts. The present invention provide a random short-term password to a remote user. In addition, the present invention confirms that the remote user entering user identifiers and passwords is in fact still an authorized individual at the time remote access is attempted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for authorized remote access to a target system, the apparatus comprising:

a security module comprising executable code stored on a storage device, executed by a processor, and configured to selectively generate an encrypted key in response to a first password and communicate the encrypted key to a remote system;

an authorization module comprising executable code stored on the storage device, executed by the processor, and configured to receive the encrypted key and a second password from the remote system, decrypt the encrypted key, determine a third password in response to authenticating the second password and identifying a remote user of the remote system within an authorized user list, and communicate the third password to the remote system; and the security module further configured to establish a remote communication connection between the remote system and the target system in response to receiving the third password from the remote system.

2. The apparatus of claim 1, wherein the first password determines a set of commands available to the remote user logged into the target system, the commands organized according to a plurality of hierarchical access levels.

3. The apparatus of claim 1, wherein the third password is operable for only a selected period of time.

4. The apparatus of claim 1, wherein the authorization module is configured to communicate with the remote user over a secure communication link between the remote system and the authorization module, and the authorization module is physically remote from the security module.

5. The apparatus of claim 1, wherein the remote user is conditionally added to the authorized user list upon completion of a remote application process.

6. The apparatus of claim 1, further comprising an update module comprising executable code stored on the storage device, executed by the processor, and configured to compare the authorized user list to a master list of personnel potentially authorized for remote access to the target system and to selectively remove remote users from the authorized user list not found on the master list.

7. The apparatus of claim 1, wherein the security module and authorization module comprise a log module comprising executable code stored on the storage device, executed by the processor, and configured to log actions of the remote user communicating communicating with the target system and the authorization module.

8. An apparatus for authorized remote access to a target system, the apparatus comprising:
a login module comprising executable code stored on a storage device, executed by a processor, and configured to establish communications with a remote user in response to a personal user identifier and a second password;
a confirmation module comprising executable code stored on the storage device, executed by the processor, and configured to determine whether the remote user is identified within an authorized user list;
a decryption module comprising executable code stored on the storage device, executed by the processor, and configured to decrypt an encrypted key provided by the remote user in response to identification of the remote user within the authorized user list, the encrypted key sent to the remote user by a target system in response to a first password received from the remote user;
a password module comprising executable code stored on the storage device, executed by the processor, and configured to derive a third password from a decrypted version of the encrypted key and communicate the third password to the remote user, wherein the remote user employs the third password to establish a remote communication connection between the remote system and the target system.

9. The apparatus of claim 8, wherein the first password defines a set of commands available to the remote user logged into the target system, the commands organized according to a plurality of hierarchical access levels.

10. The apparatus of claim 8, wherein the third password is operable for a selected period of time.

11. The apparatus of claim 8, wherein the authorization module is configured to communicate with the remote user over a secure communication link.

12. The apparatus of claim 8, wherein an authorized remote user is conditionally added to the authorized user list in response to approval from at least two supervisors of the user upon completion of a remote application process.

13. The apparatus of claim 8, further comprising an update module comprising executable code stored on the storage device, executed by the processor, and configured to compare the authorized user list to a master list of personnel potentially authorized for remote access to the target system and to selectively remove remote users from the authorized user list not found on the master list.

14. The apparatus of claim 8, further comprising a log module comprising executable code stored on the storage device, executed by the processor, and configured to log communications between the remote user and the apparatus.

15. A system for authorized remote access to a target system, comprising:
a target system configured to selectively generate an encrypted key in response to a first password received from a remote system and communicate the encrypted key to the remote system;
authorization server configured to receive the encrypted key and a second password from the remote system, decrypt the encrypted key and determine a third password in response to authenticating the second password and identifying a remote user of the remote system within an authorized user list, the authorization server configured to then send the third password to the remote system; and
the target system further configured to establish a remote communication connection with the remote system in response to the third password received from the remote system.

16. The system of claim 15, wherein the first password determines a set of commands available to a remote user remotely accessing the target system.

17. The system of claim 15, wherein the third password is operable for a limited time period.

18. The system of claim 15, wherein the remote user is conditionally added to the authorized user list upon completion of a remote application process.

19. The system of claim 15, further comprising an update module comprising executable code stored on a storage device, executed by a processor, and configured to compare the authorized user list to a master list of personnel potentially authorized for remote access to the target system and to selectively remove remote users from the authorized user list not found on the master list.

20. The system of claim 15, wherein the target system and authorization server are configured to log actions of a user of the remote system.

21. The system of claim 15, wherein the target system comprises a data storage system.

22. A method for authorized remote access to a target system, comprising:
retrieving an encrypted key from a target system accessed by way of a first password;

connecting to an authorization module using a second password in order to retrieve a third password associated with the encrypted key, the authorization module selectively decrypting the encrypted key in response to determining that a remote user is identified within an authorized user list, wherein the authorization module is physically remote from the target system; and logging into the target system using the third password.

23. The method of claim 22, wherein the first password determines a set of commands available to the remote user logged into the target system, the commands organized according to a plurality of hierarchical access levels.

24. The method of claim 22, wherein the third password is operable for a limited time period.

25. The method of claim 22, wherein the remote user communicates over a secure communication link to the authorization module.

26. The method of claim 22, further comprising completing a remote access application process that conditionally adds the remote user to the authorized user list.

27. The method of claim 22, further comprising comparing the authorized user list to a master list of personnel potentially authorized for remote access to the target system and selectively removing remote users from the authorized user list not found on the master list.

28. The method of claim 22, further comprising logging actions of the remote user communicating with the target system and the authorization module.

29. A method for authorized remote access to a target system, comprising:

sending an encrypted key to a remote system in response to authenticating a remote user using a first password;

connecting to the remote system in response to the remote user entering a third password associated with the encrypted key, the third password provided to the remote user logged into an authorization module using a second password, the authorization module selectively decrypting the encrypted key received from the remote user in response to determining that the remote user is identified within an authorized user list.

30. The method of claim 29, wherein the first password determines a set of commands available to the remote user logged into the target system, the commands organized according to a plurality of hierarchical access levels.

31. The method of claim 29, wherein the third password is operable for a limited time period.

32. The method of claim 29, further comprising completing a remote access application process that conditionally adds the remote user to the authorized user list.

33. The method of claim 29, further comprising comparing the authorized user list to a master list of personnel potentially authorized for remote access to the target system and selectively removing remote users from the authorized user list not found on the master list.

34. The method of claim 29, further comprising logging actions of the remote user communicating with the authorization module and a target system.

35. An apparatus for authorized remote access to a target system, comprising:

means for retrieving an encrypted key from a target system accessed by way of a first password, the retrieving means comprising executable code stored on a storage device and executed by a processor;

means for connecting to an authorization module using a second password to retrieve a third password associated with the encrypted key, the authorization module selectively decrypting the encrypted key in response to determining that a remote user is identified within an authorized user list, the connecting means comprising executable code stored on the storage device and executed by the processor; and means for logging into the target system using the third password, the logging means comprising executable code stored on the storage device and executed by the processor.

36. The apparatus of claim 35, wherein the first password determines a set of commands available to the remote user logged into the target system, the commands organized according to a plurality of hierarchical access levels.

37. The apparatus of claim 35, further comprising means for logging actions of the remote user communicating with the target system and the authorization module, the remote logging means comprising executable code stored on the storage device and executed by the processor.

38. An article of manufacture comprising a program storage medium readable by a processor and embodying one or more instructions executable by a processor to perform a method for authorized remote access to a target system, the method comprising:

retrieving an encrypted key from a target system accessed by way of a first password;

connecting to an authorization module using a second password to retrieve a third password associated with the encrypted key, the authorization module selectively decrypting the encrypted key in response to determining that a remote user is identified within an authorized user list; and logging into the target system using the third password.

39. The article of manufacture of claim 38, wherein the first password determines a set of commands available to the remote user logged into the target system, the commands organized according to a plurality of hierarchical access levels.

40. The article of manufacture of claim 38, further comprising logging actions of the remote user communicating with the target system and the authorization module.

* * * * *